ALL-PASS DELAY EQUALIZER NETWORK

Filed Sept. 21, 1967 3 Sheets-Sheet 1

INVENTORS
BRIAN HUGHES
FREDERICK T. HALSEY
AGENT
Curphey & Erickson

ALL-PASS DELAY EQUALIZER NETWORK

Filed Sept. 21, 1967 3 Sheets-Sheet 2

INVENTORS
BRIAN HUGHES
FREDERICK T. HALSEY
AGENT
Curphey & Erickson

INVENTORS
BRIAN HUGHES
FREDERICK T. HALSEY
BY Curphey & Erickson
PATENT AGENTS

United States Patent Office 3,518,581
Patented June 30, 1970

3,518,581

ALL-PASS DELAY EQUALIZER NETWORK

Brian Hughes, Carleton Place, Ontario, and Frederick T. Halsey, Ottawa, Ontario, Canada, assignors to Northern Electric Company Limited, Montreal, Quebec, Canada Filed Sept. 21, 1967, Ser. No. 669,513
Int. Cl. H03h 7/04; H04b 3/14
U.S. Cl. 333—28 4 Claims

ABSTRACT OF THE DISCLOSURE

A compensating impedance for substantially reducing the variation in attenuation across the pass band of a filter, or the area of maximum phase shift in a delay equalizer network, each of the unbalanced type. The compensating impedance, which has a resistive component, is connected between the centre of a series component in the network and the common conductor.

This invention relates to an electrical transmission network and more particularly to a compensating circuit for substantially reducing the variation in attenuation across the pass band of a filter network, or the region of maximum phase shift in an all-pass delay equalizer network.

In the design of a filter network, the components are generally chosen to co-act to produce a desired response for an idealized or lossless case. However, resistive losses in the individual components result in a deviation from the theoretical amplitude response of an ideal filter. This deviation is most evident in the pass band where it results in an increase in the minimum insertion loss and a rolloff near the cutoff frequency or frequencies of the filter. While the insertion loss can be readily overcome by passing the signal through an ancillary wide band amplifier, the rolloff is more difficult to overcome without changing other parameters of the filter.

A similar problem exists in an all-pass or delay equalizer network in which the lack of infinite Q in the reactive components causes a depression to appear in the amplitude response in the area of maximum phase delay.

One method of compensating for this variation in attenuation is to utilize an attenuation equalizer network which is connected in cascade with the filter or delay equalizer network. The design of an attenuation equalizer is discussed at length in chapter 6 of "Simplified Modern Filter Design" by Philip R. Geffe; John F. Rider Publisher, Inc. The attenuation equalizer network is designed to have an amplitude response across the pass band which is the inverse of that in the filter or delay equalizer network resulting from the lossy components. However, besides introducing a considerable number of additional components to the overall design, the attenuation equalizer introduces unwanted phase shift and sometimes mismatch thereby reducing its effectiveness.

Another method which is widely used for overcoming the rolloff filters utilizes predistortion or precorrection wherein the idealized filter is designed to have an overall response which rises near the cutoff frequencies. This is counteracted by the normal rolloff in the practical model thus resulting in an overall response which is maintained relatively flat. However, predistortion further complicates the design and may introduce undesired mismatch. Additionally, predistortion can only compensate at discrete points in the pass band and at other points, a compromise must be accepted. This method of compensation is discussed at length on pages 537 et seq. of "Synthesis of Passive Networks" by Ernst A. Guillemin; John Wiley and Sons, Inc.

In the majority of delay equalizer designs, it is more convenient to synthesize a symmetrical lattice or balanced network. However, in most practical applications, a balanced network is inconvenient and more costly to construct. Hence, it is desirable to convert such a lattice configuration to the equivalent bridged-T form. Such a conversion when applied to an idealized network can be readily carried out by Bartlett's bisection theorem. However, the conversion of a realizable network having component losses is considerably more complex. As a result, the synthesis of an unbalanced attenuation equalization network for such delay equalizer network which will fully compensate for resistive losses in it without introducing other undesirable characteristics, has been found very difficult to achieve.

It has been discovered that a substantial reduction in the variation in attenuation across the pass band of a filter or the area of maximum phase shift of a delay equalizer network is obtained, by connecting an impedance having a resistive component from approximately the center of a series component in a network to the common conductor.

In many cases, a single resistance of a predetermined value will result in a significant reduction in the variation in attenuation. Such is the case in an all-pass delay equalizer network of the bridged-T type, wherein a single resistor of a predetermined value, connected in shunt with the network from the center of the bridging arm, will provide a significant reduction in the variation in attenuation about the area of maximum phase shift. The value of the compensating resistor can be readily determined empirically.

In many filters, a complex compensating impedance, which is either resonant at the center frequency of a band-pass filter or antiresonant at the cutoff frequencies of the pass band, will further improve the reduction in variation of attenuation without appreciably affecting other parameters. Here, the reactive component values for resonance at the center or cutoff frequencies of the filter can be determined from the band-pass characteristics of the filter, while the resistive values of the compensating impedance can be determined empirically.

Example embodiments of the invention will now be described with reference to the accompanying drawings in which.

Figures 7A, 7B, 7C, 8:
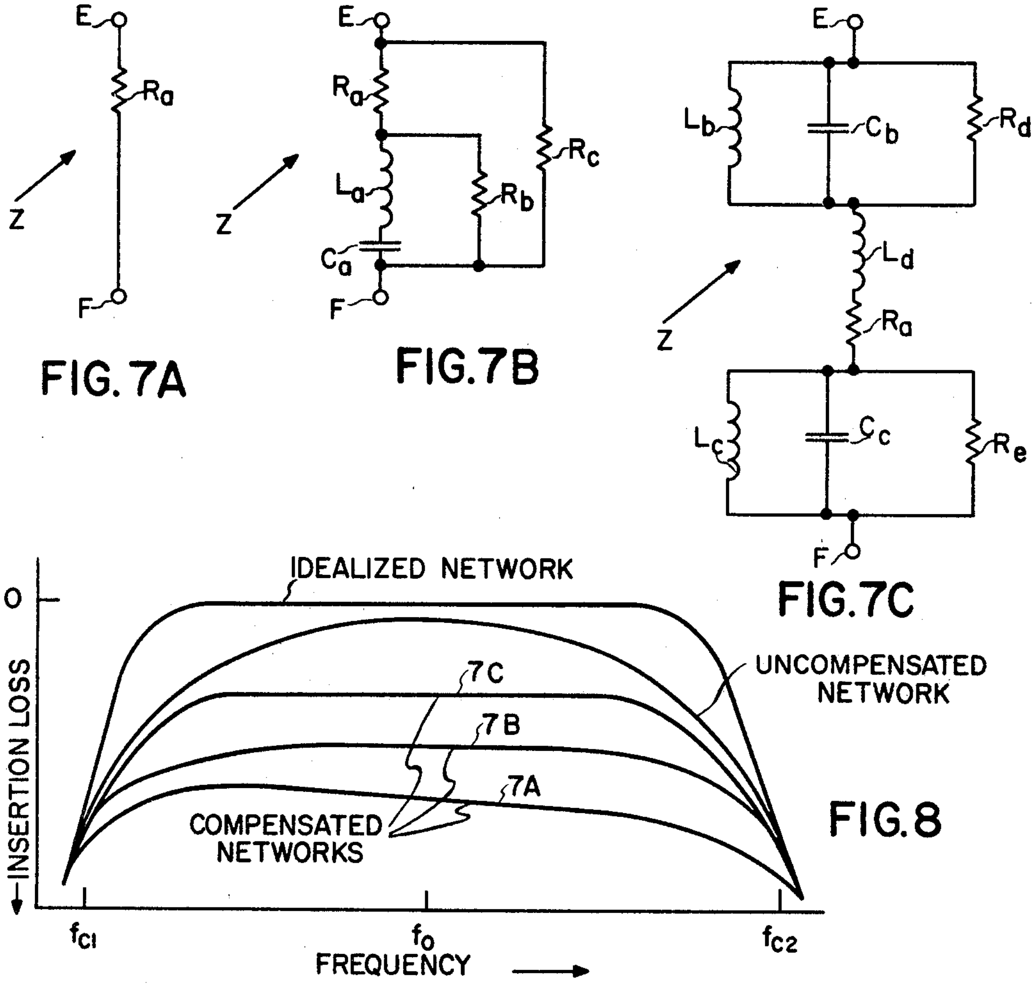
FIGS. 7A, 7B and 7C illustrate schematically three embodiments of the compensating impedance which may be utilized in the filters or equalizers illustrated in FIGS. 1 to 6.
FIG. 8 is a graph of insertion loss versus frequency for a typical band-pass filter with and without a compensating impedance of the present invention.

In the following embodiments, the compensating impedance illustrated in FIG. 7A may be inserted in any one of the networks, while the ones illustrated in FIGS. 7B or 7C are restricted to band-pass filters. The actual choice will depend upon the design requirements of the network which will include such factors as the degree of compensation required, the mismatch or return loss which can be tolerated, and the amount of additional insertion loss which can be tolerated due to the addition of the compensating impedance.

In the following specification, the term "reactances of one type" includes either inductances or capacitances, while at the same time the term "reactances of the other type" includes either capacitances or inductances respectively. The ultimate choice will be dictated by the filter requirements (i.e., low-pass, high-pass or band-pass) or equalizer configuration.

Each of the networks illustrated in FIGS. 1 to 6 has a pair of input terminals A and B for connection to a source of alternating voltage, a pair of output terminals C and D for connection to a load, and a pair of compensation impedance terminals E and F. All networks are of an unbalanced design and have the terminals B, D, and F connected together. In FIGS. 7A, 7B and 7C, the various forms of compensating impedance are connected to the networks through terminals E and F.

When possible, all reactive components are shown in normalized form. Thus, for a 1-ohm termination, an inductance of $L_1$ would resonate with a capacitance $C_1$ at a predetermined frequency $\omega_1$. An inductance of $2L_1$ would then have twice the reactance as that of $L_1$ at the same frequency. The equivalent resistive loss for all the components bearing the subscript 1 would then be $R_1$. Like reference characters are used to designate similar or corresponding points. The derivation of these component values is well known to those in the filter art and a general discussion of this can be found in each of the above-mentioned texts.

Figure 1:
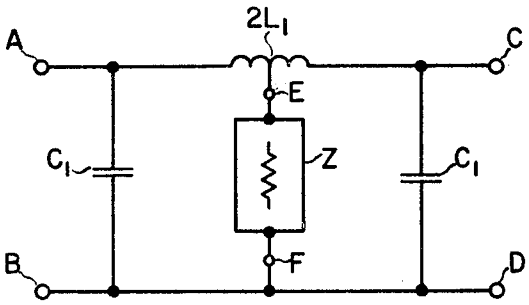
FIGS. 1, 2 and 3 illustrate schematically $\pi$-section low-pass, high-pass and band-pass filter networks respectively, each utilizing a compensating impedance in accordance with the present invention.

FIG. 1 illustrates a typical $\pi$-section low-pass filter having two shunt capacitors $C_1$ connected across terminals A and B, and C and D, respectively; and a series center tapped inductance $2L_1$ connected between terminals A and C. The compensating impedance Z is connected from terminal E to the center tap on the inductance $2L_1$. While there is only a single industance shown in this embodiment, other embodiments may include two separate inductances having no mutual coupling between them.

Figure 2:
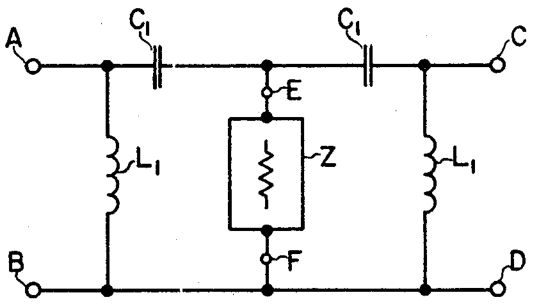

FIG. 2 illustrates a typical $\pi$-section high-pass filter having two inductances $L_1$ connected in shunt with terminals A and B, and C and D respectively; and two capacitances $C_1$ connected in series between terminals A and C. The compensating impedance Z is connected to the common junction of the two capacitors $C_1$ through terminal E.

Figure 3:
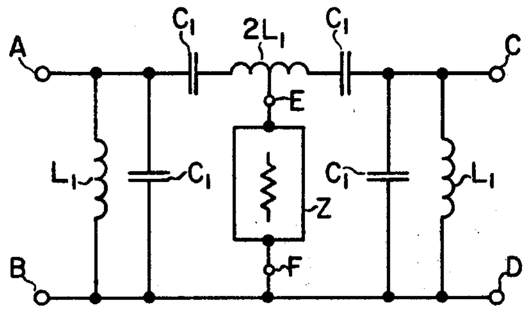

FIG. 3 illustrates a typical $\pi$-sectional band-pass filter having two shunt resonant circuits each comprising an inductance $L_1$ and a capacitance $C_1$ connected in parallel with terminals A and B, and C and D. Additionally, a series resonant circuit, comprising two capacitances $C_1$ and interposed centre tapped inductance $2L_1$, is connected between terminals A and C. Connected from the center tap on the interposed inductance $2L_1$ is the compensating impedance Z through the terminal E.

Figure 4:
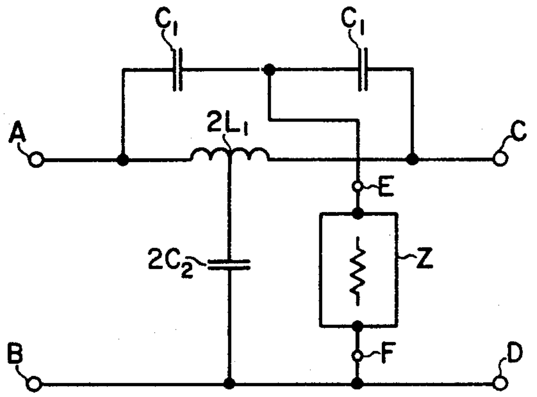
FIGS. 4, 5 and 6 illustrate schematically various bridged-T delay equalizer networks, each utilizing a compensating impedance in accordance with the present invention.

FIG. 4 illustrates one embodiment of a bridged-T delay equalizer network. The T-arm comprises a center tapped inductance $2L_1$ connected in series between the terminals A and C with a capacitance $2C_2$ connected from the center tap to the terminal B. The bridging arm comprises two equal capacitances $C_1$ connected in series between the terminals A and C. The compensating impedance Z is connected from the junction of the two series capacitances $C_1$ at terminal E.

Figure 5:
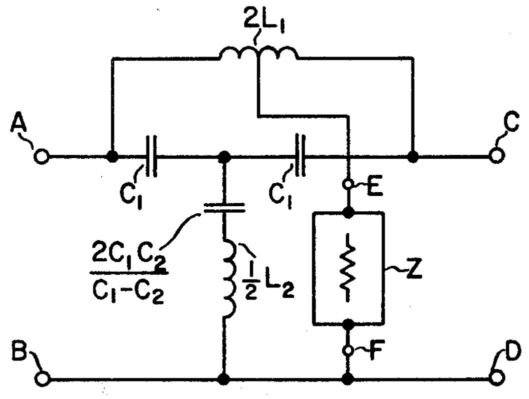

FIG. 5 illustrates a second embodiment of a bridged-T delay equalizer network in which the T-arm comprises two capacitances $C_1$ connected in series between the terminals A and C, and a shunt arm having a series connected capacitance $2C_1C_2/(C_1-C_2)$ and an inductance $L_2/2$ connected between the junction of the capacitors $C_1$ and the terminal B. The bridging arm comprises a center tapped inductance $2L_1$. Connected from the center tap of the inductance $2L_1$ is the compensating impedance Z through the terminal E.

Figure 6:
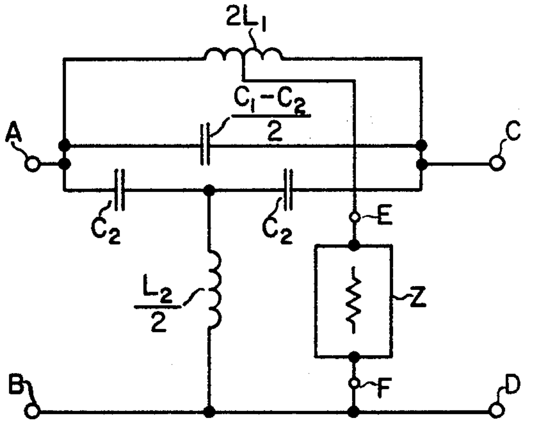

FIG. 6 illustrates a third embodiment of a bridged-T delay equalizer network in which the T-arm comprises two capacitances $C_2$ connected in series between the terminals A and C, and a shunt arm having an inductance $L_2/2$ connected between the junction of the capacitances $C_2$ and the terminal B. The bridging arm comprises a center tapped inductance $2L_1$ connected in shunt with a capacitance $(C_1-C_2)/2$ between terminals A and C. Connected from the center tap of the inductance $2L_1$ is the compensating impedance Z, through the terminal E.

In the embodiments of FIGS. 4, 5 and 6, each of the component values is derived in a well known manner from the equivalent lattice configuration where:

$L_1$ and $C_1$ are the values of the reactances connected in shunt with each other in two of the opposed legs; and $L_1$ and $C_2$ are the values of the reactances connected in series with each other in the other two opposed legs.

With a source impedance and a load impedance of $Z_0$ connected across terminals A–B and C–D of FIGS. 4, 5 and 6 respectively, the following relationship exists:

$$Z_0^2=L_1/C_2=L_2/C_1$$

Figure 10:
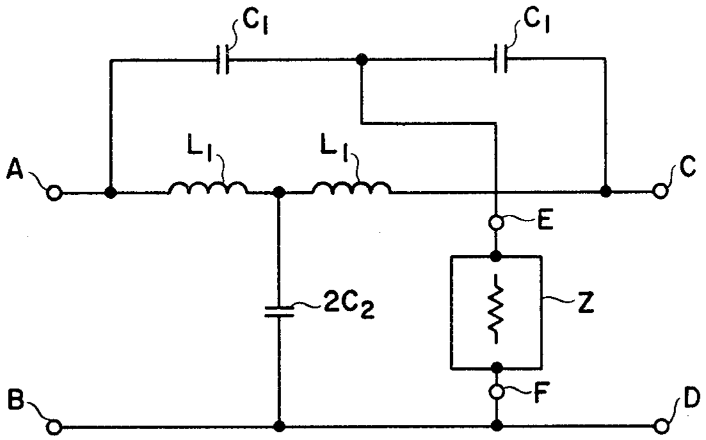
FIGS. 10, 11 and 12 illustrate schematically alternate embodiments of the bridged-T delay equalizer networks shown in FIGS. 4, 5 and 6 respectively.
Figure 11:
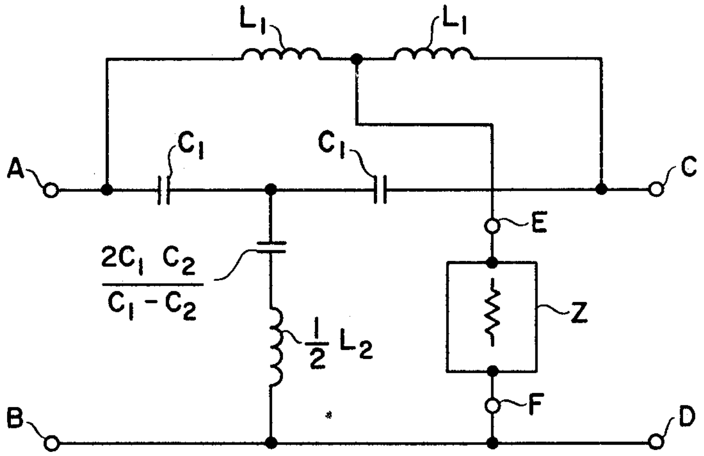
Figure 12:
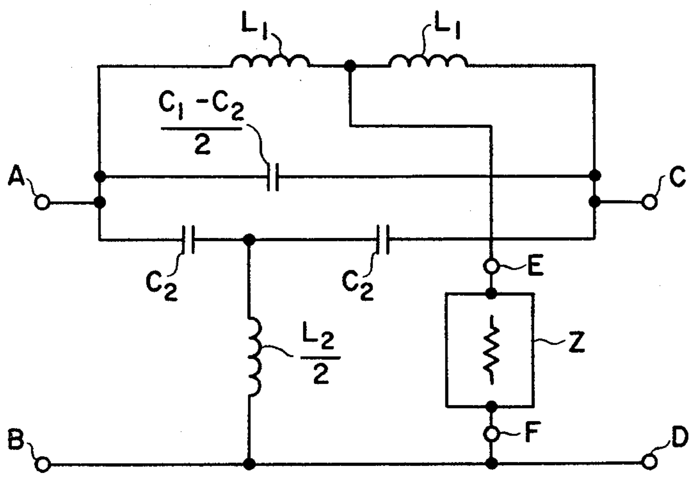

Each of the above described networks is typical of those to which the present invention can be applied. Thus, the $\pi$-section filters may be replaced by other more complex configurations. Additionally, various other forms of delay equalizer network can be constructed to which the present invention may be readily applied. However, in each case the compensating impedance is connected from approximately the center point of a series reactance in the unbalanced network to the common connection. In the case of series inductances, two equal inductances may replace a single center tapped inductance. While in the case of series capacitances, two equal series capacitances will be required. This is illustrated in FIGS. 10, 11 and 12 which are identical to FIGS. 4, 5 and 6 respectively, except that in FIG. 10 the center tapped series inductance $2L_1$ of FIG. 4, is replaced by two serially connected inductances $L_1$. In FIGS. 11 and 12, the center tapped shunt inductance $2L_1$ of FIGS. 5 and 6, is replaced by two serially connected inductances $L_1$.

Various embodiments of the compensating impedance Z may be used. For instance, FIG. 7A illustrates a single resistance $R_a$ connected between the terminals E and F. The single resistance $R_a$ provides good compensation in reducing variations in attenuation in the area of maximum phase shift, for the delay equalizer networks of FIGS. 4, 5 and 6. With a source and load impedance of $Z_0$ connected to input terminals A and B, and output terminals C and D respectively, it has been found that the compensating resistance $R_a$ of FIG. 7A is approximately equal to:

$$R_a=\frac{1}{2}\,\frac{Z_0^2}{R_2+Z_0^2/R_1}$$

where in FIGS. 4, 5 and 6.

$R_1$= the total effective resistance of the resistive losses of the inductances $L_1$ and capacitances $C_1$, in parallel with the series arm of the network; and $R_2$=the total effective resistance the resistive losses of the inductances $L_2$ and capacitances $C_2$ in series with the shunt arm of the network.

While the resistance $R_a$ reduces the variation in attenuation across the pass band of the filter networks some rolloff may remain. Also, in some instances, an overall upward or downward slope remains. This is particularly apparent in band-pass filter networks, and may be substantially reduced again by utilizing either of the compensation networks disclosed in FIGS. 7B or 7C.

In FIG. 7B, the resistance $R_a$ is connected in series with a resonant circuit including an inductance $L_a$ and a capacitance $C_a$. The latter is resonant near the centre frequency of the pass band in a band-pass filter. Resistance $R_b$ connected in shunt with the resonant circuit, and resistance $R_c$ connected in shunt across the overall compensating network, are added to provide slope control across the pass band of the network. Because the circuit comprising the inductance $L_a$ and the capacitance $C_a$ is series resonant, the compensating impedance Z increases the insertion loss primarily at or near the center frequency $f_0$. Away from the centre freqeuncy, the loading of the impedance Z on the network diminishes thereby resulting in an overall flatter response. The values of the three resistances $R_a$, $R_b$ and $R_c$ are readily determined empirically. They will depend not only upon the Q of the series resonant circuit in the compensating impedance Z but also upon the total losses of the components in the network.

FIG. 7C shows a third embodiment of the compensating impedance Z which is also applicable to band-pass filter networks. It comprises a first antiresonant circuit comprising an inductance $L_b$ and capacitance $C_b$ which are designed to resonate at the lower cutoff frequency $f_{c1}$ of the pass band. A second antiresonant circuit, comprising an inductance $L_c$ and a capacitance $C_c$, resonates about the upper cutoff frequency $f_{c2}$ of the pass band. These two antiresonant circuits are connected in series with each other and the compensating resistance $R_a$ and an additional slope control inductance $L_d$. In some circuits, the inductance may be replaced by a capacitance $C_d$. Additionally, connected in shunt with the first and second antiresonant circuits are resistors $R_d$ and $R_e$ respectively which control the response near the resonant frequencies of the associated tank circuits.

In the compensating impedance Z of FIG. 7C the main compensation takes effect at the center frequency of the pass band $f_0$ due to the loading of the resistance $R_a$. Near the cutoff frequencies $f_{c1}$ and $f_{c2}$, the compensating effect diminishes due to the antiresonant circuits. While the circuit of FIG. 7C utilizes more components than that of FIG. 7B, a higher value of resistance $R_a$ may be used thereby diminishing the overall insertion loss resulting from the addition of the compensating impedance Z. Again, the values of the resistances $R_a$, $R_d$ and $R_e$ and the inductance $L_d$ (or $C_d$) are chosen empirically to provide optimum compensation across the pass band of the filter network.

FIG. 8 is a graph of insertion loss versus frequency for a typical band-pass filter with and without compensation. The upper curve illustrates an idealized filter response across the top of the pass band in a Butterworth filter.

The amplitude response of an uncompensated band-pass filter network is shown next with minimum insertion loss at the center frequency $f_0$ and gradually rolling off towards the cutoff frequencies $f_c$ of the pass band and then increasing sharply in the stopband.

The bottom curve illustrates the amplitude response of a typical band-pass filter utilizing a single compensating resistance $R_a$ as shown in FIG. 7A. While the resistance has decreased the overall variation in attenuation across the pass band, it has introduced a downward slope. This can be additionally reduced by utilizing the compensating impedance Z of FIG. 7B, as shown in the curve immediately above. As an alternative, the compensating impedance Z of FIG. 7C may be used with even less overall insertion loss through the filter. As can be seen, the negative slope introduced by the simple compensating impedance Z of FIG. 7A is substantially eliminated by using either of the networks of FIG. 7B or 7C.

As an example, a 5-pole Chebychev band-pass filter was tested with the following results:

BAND-PASS FILTER 60–80 Mc.

| Compensating impedance | Attenuation variation (db) | Return loss (db) |
|---|---|---|
| None | 0.25 | 30 |
| Fig. 7A | 0.1 | 18 |
| Fig. 7B | 0.03 | 23 |
| Fig. 7C | <0.01 | 25 |

Other variations of the compensating impedances Z are applicable to high and low-pass filters for further improving the pass band characteristics. For instance, a capacitance or inductance may be connected in series with the resistance $R_a$ of FIG. 7A to improve the response characteristics of the high or low-pass filter respectively. Additionally, an antiresonant circuit connected in series with resistance $R_a$ and tuned to approximately the cutoff frequency of the filter will further reduce rolloff in the passband.

Figure 9:
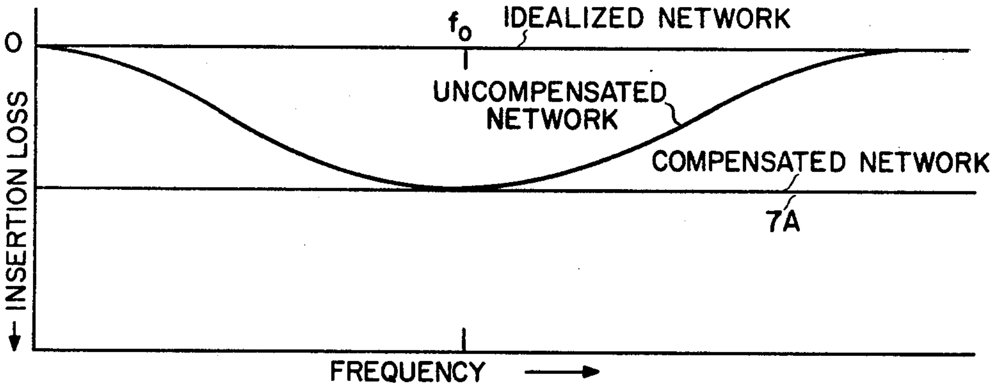
FIG. 9 is a graph of insertion loss versus frequency for a typical delay equalizer with and without a compensating impedance of the present invention.

FIG. 9 is a graph of insertion loss versus frequency for a typical all-pass delay equalizer network with and without the compensating impedance Z of the present invention. The upper curve illustrates an idealized all-pass network having no insertion loss and a flat response across the frequency band. The next curve illustrates the amplitude response of a typical uncompensated delay equalizer network showing the characteristic notch which occurs about the frequency of maximum phase shift $f_0$.

The bottom curve illustrates a typical delay equalizer network utilizing a single compensating resistor $R_a$ as shown in FIG. 7A. While there has been an overall increase in the insertion loss across the frequency spectrum, the characteristic depression in the delay equalizer network, resulting from lack of infinite Q in the reactive components, has been virtually eliminated by utilizing the compensating impedance of the present invention.

What is claimed is:

1. In an all-pass bridged-T delay equalizer network adapted to be connected to an unbalanced transmission line, said network comprising:

a series arm having two equal reactances of one type; an interposed shunt arm including a reactance of the other type; and a bridging arm having two equal series reactances of the other type;

said reactances coacting together to provide an all-pass network having a predetermined phase delay at a predetermined frequency; each of said reactances having a finite resistive loss, thereby resulting in a variation in attenuation about said predetermined frequency;

the improvement comprising: a further shunt arm, interposed said two equal series reactances of the other type, including a resistance having a value approximately equal to:

$$\frac{1}{2}\frac{Z_0^2}{R_2+Z_0^2/R_1}$$

where:

$Z_0$=the characteristic impedance of the transmission line;

$R_1$=the resistance of the resistive losses effectively in parallel with series arm of said network; and $R_2$=the resistance of the resistive losses effectively in series with the shunt arm of said network.

2. In an all-pass bridged-T delay equalizer network adapted to be connected to an unbalanced transmission line having an impedance $Z_0$, said network comprising:

a series arm having a center tapped inductance with a value $2L_1$; an interposed shunt arm having a capacitance with a value $2C_2$; and a bridging arm having two equal series capacitances each with a value $C_1$; such that:

$$Z_0^2=\frac{L_1}{C_2}=\frac{L_2}{C_1}$$

whereby said network has a predetermined phase delay at a predetermined frequency; said inductances and capacitances each have a finite resistive loss, thereby resulting in a variation in attenuation about said predetermined frequency;

the improvement comprising: a further shunt arm, interposed said two equal capacitances, having a resistor with a value $R_a$ such that:

$$R_a=\frac{1}{2}\frac{Z_0^2}{R_2+Z_0^2/R_1}$$

where:

$R_1$ is the equivalent resistive loss of the reactances having subscript 1 when connected in shunt with said series arm; and $R_2$ is the equivalent resistive loss of the reactances having subscript 2 when connected in series with the shunt arm; whereby said resistor substantially reduces said variation in attenuation.

3. In an all-pass bridge-T delay equalizer network adapted to be connected to an unbalanced transmission line having an impedance $Z_0$, said network comprising:

a series arm having two equal series capacitances each with a value $C_1$; an interposed shunt arm having an inductance with a value $L_2/2$ in series with a capacitance with a value $2C_1C_2/(C_1-C_2)$; and a bridging arm having a center-tapped inductance with a value $2L_1$ such that:

$$Z_0^2=\frac{L_1}{C_2}=\frac{L_2}{C_1}$$

whereby said network has a predetermined phase delay at a predetermined frequency; said inductances and capacitances each have a finite resistive loss, thereby resulting in a variation in attenuation about said predetermined frequency;

the improvement comprising: a further shunt arm, interposed said center tap, having a resistance with a value $R_a$ such that $$R_a=\frac{1}{2}\frac{Z_0^2}{R_2+Z_0^2/R_1}$$

where:

$R_1$ is the equivalent resistive loss of the reactances having subscript 1 when connected in shunt with said series arm; and $R_2$ is the equivalent resistive loss of the reactances having subscript 2 when connected in series with the shunt arm; whereby said resistor substantially reduces said variation in attenuation.

4. In an all-pass bridge-T delay equalizer network adapted to be connected to an unbalanced transmission line having an impedance $Z_0$, said network comprising:

a series arm having a capacitance with a value $$\frac{C_1-C_2}{2}$$

in shunt with two equal series capacitances each having a value $C_2$; an interposed shunt arm connected to the junction of said two equal series capacitances; said shunt arm having an inductance with a value $L_2/2$; and a bridging arm having a center tapped inductance with a value $2L_1$, such that $$Z_0^2=\frac{L_1}{C_2}=\frac{L_2}{C_1}$$

whereby said network has a predetermined phase delay at a predetermined frequency; said inductances and capacitances each having a finite resistive loss, thereby resulting in a variation in attenuation about said predetermined frequency;

the improvement comprising: a further shunt arm interposed said center tap, having a resistance with a value of $R_a$ such that;

$$R_a=\frac{1}{2}\frac{Z_0^2}{R_2+Z_0^2/R_1}$$

where:

$R_1$ is the equivalent resistive loss of the reactances having subscript 1 when connected in shunt with said series arm; and $R_2$ is the equivalent resistive loss of the reactances having subscript 2 when connected in series with the shunt arm; whereby said resistance substantially reduces said variation in attenuation.

References Cited

UNITED STATES PATENTS

| | | | |
|---|---|---|---|
| 1,955,788 | 4/1934 | Bode | 333—74 |
| 2,002,216 | 5/1935 | Bode | 333—75 |
| 2,029,014 | 1/1936 | Bode | 333—75 |
| 2,029,698 | 2/1936 | Bode | 333—75 |
| 2,567,380 | 9/1951 | Kingsbury | 333—75 X |
| 2,585,841 | 2/1952 | Richardson | 333—75 X |
| 2,585,842 | 2/1952 | Richardson | 333—75 X |

OTHER REFERENCES

Skwirzynski, J. K.: "Design Theory and Data For Electrical Filters," Van Nostrand Co., 1965, pp. 210–221, TK7872F5S5.

ELI LIEBERMAN, Primary Examiner

W. H. PUNTER, Assistant Examiner

U.S. Cl. X.R.

333—75, 70